Patented Aug. 19, 1941

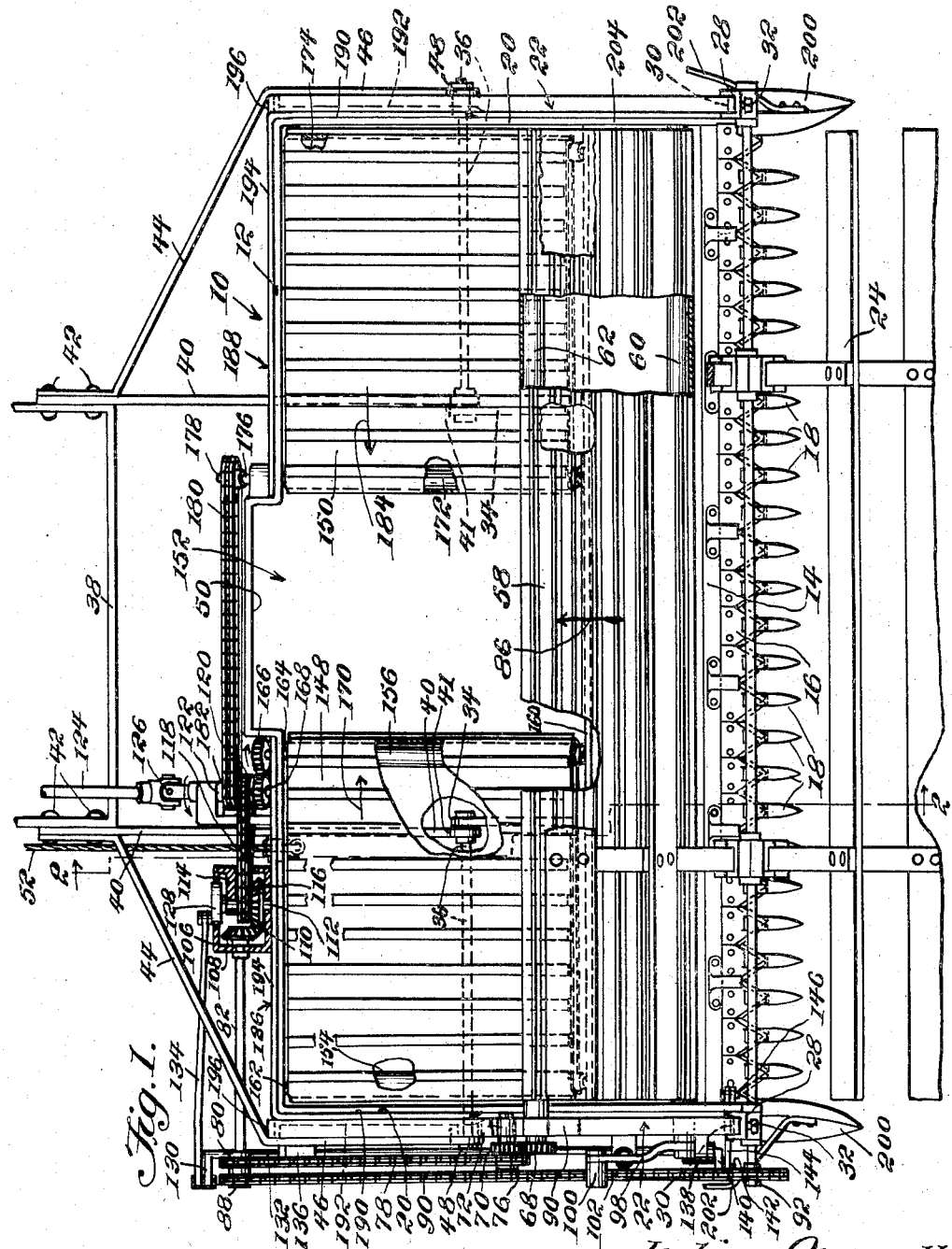

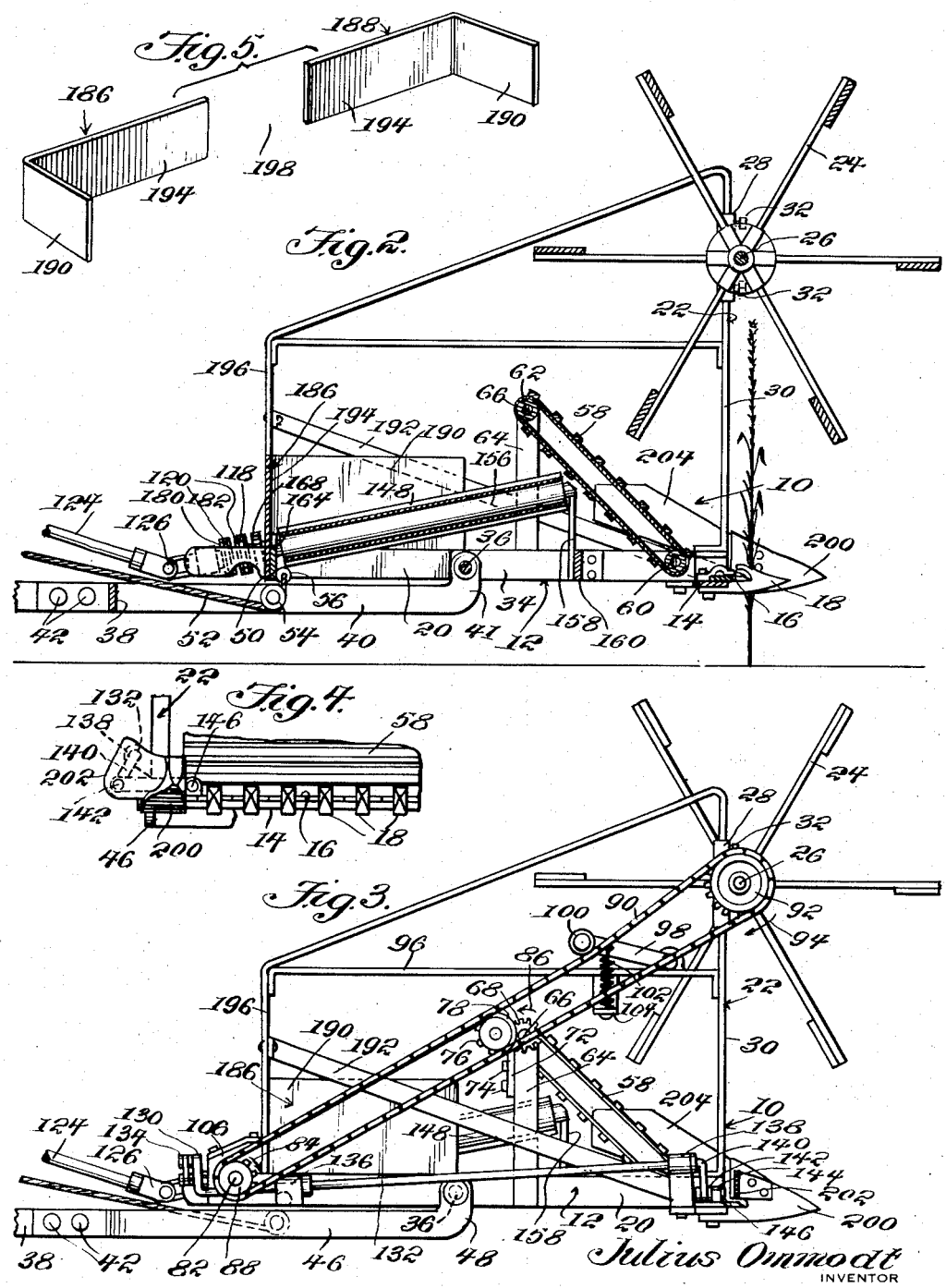

2,253,044

UNITED STATES PATENT OFFICE 2,253,044

WINDROW HARVESTER

Julius Ommodt, Butterfield, Minn.

Application December 3, 1938, Serial No. 243,845

1 Claim. (Cl. 56—23)

My invention relates to agricultural implements, and has among its objects and advantages the provision of an improved windrow harvester.

An object of my invention is to provide a windrow harvester for cutting grain and the like and forming the cut material into windrows to facilitate thorough and even drying thereof. The windrow harvester is designed to be power propelled in advance of a tractor, as an example. The unit is designed to be pivotally connected with a supporting frame fixedly anchored to the tractor, and the windrow forming means are so arranged as to locate the windrow within the traction wheels of the machine so as to prevent damage to the cut grain. I also provide a windbreak in association with the windrow harvester.

In the accompanying drawings:

Figure 1 is a top plan view of my windrow harvester with certain parts broken away for the sake of clearness;

Figure 2 is a sectional view along the line 2—2 of Figure 1;

Figure 3 is an end elevational view;

Figure 4 is a detail view of one of the shoes associated with the sickle bar, and the rod shaft for operating the sickle knife; and Figure 5 is a perspective view of the windbreak adapted for connection with the harvester.

In the embodiment selected to illustrate my invention, the windrow harvester 10 comprises a frame 12, the forward margin of which comprises the usual sickle bar 14 provided with the usual sickle knife 16. Sickle bar 14 is provided with the usual guards 18, and the sickle knife 16 is operated in the usual reciprocatory manner for cutting the grain or other standing growth. To each end run 20 of the frame 12 I mount a vertical frame 22 which supports one end of a reel 24. Reel 24 is fixedly related to a shaft 26 journaled in bearing members 28 adjustable vertically of the vertical bars 30 of the frames 22. Bearing members 28 may be made secure by set screws 32. Figures 2 and 3 illustrate the operating relation between the reel 24 and the sickle bar 14.

Frame 12 includes short transverse members 34 to which and the end frame members 20 I connect shafts 36, which shafts are arranged in axial alignment, but spaced in the manner of Figure 1. To the mount or frame 38, which is fixedly secured to the tractor (not shown) in advance thereof, I fixedly secure two bars 40 which have their forward ends bent up, as illustrated at 41 in Figure 2, and pivotally connected with their respective shafts 36. Bars 40 are riveted to the frame 38, as at 42. Diagonal bars 44 are also fixedly related to the frame 38 through the medium of the rivets 42, and include parallel runs 46, which have upstanding ends 48, see Figure 3, pivotally related to their respective shafts 36 so that the frame 12 as a whole may pivot upon the shafts 36 as a unit for raising and lowering the sickle bar 14 for cutting the grain at different heights.

Referring to Figures 2 and 3, it will be noted that the axes of the shafts 36 are spaced considerably closer to the rear frame member 50 than to the sickle bar 14 so that the forward or leading side of the frame will be considerably heavier than the rear margin. Thus the forward side of the frame will tend to pivot downwardly, which pivotal movement is restrained by means of a rope or cable 52 passing around a grooved wheel 54 pivotally mounted on one of the bars 40 and connected at one end with an eye 56 fixedly related to the rear frame 50. The other end of the rope or cable passes rearwardly for connection with a suitable lever or take-up drum operated from the tractor. Thus slack imparted to the rope or cable 52 will permit the sickle bar 14 to lower.

Extending along the forward side of the frame 12 and immediately in the rear of the sickle bar 14 is an elevating canvas 58 which inclines upwardly from a position in the rear of the sickle bar. Elevating canvas 58 extends the full width of the frame 12 for collecting all the grain cut by the knife 16. The canvas is supported on two rollers 60 and 62. Roller 60 has its ends rotatably journaled in the end frame member 20, while the roller 62 is rotatably journaled in the upper ends of vertical bars 64 riveted to the end frame members 20. The shaft 66, on which the roller 62 is mounted, is provided with a gear 68 arranged in mesh with a gear 70 rotatably journaled in a bracket 72 attached to the bar 64 by screws 74.

Gear 70 is fixedly related to a sprocket 76 about which I position a chain 78 operating over a sprocket 80 keyed to a shaft 82. Rotation of the sprocket 80 in the direction indicated by the arrow 84 in Figure 3 will rotate the sprocket 68 in the direction of the arrow 86 for elevating the cut grain. Shaft 82 also carries a sprocket 88 about which I position a chain 90 which operates around the sprocket 92 fixedly related to the shaft 26 for driving the reel 24. Reel 24 is rotated in the direction of the arrow 94.

To the horizontal brace member 96, on one of the vertical frames 22, I pivotally mount a bar 98 provided with a roller 100 arranged to run on the upper stretch of the chain 78 for holding the chain under proper tension. One end of a tension spring 102 is connected with the bar 88 and its opposite edges connect with a bracket 104 attached to the brace member 96. Shaft 82 extends into a gear box 106 and is keyed to a bevel gear 108 arranged in mesh with a bevel gear 110, keyed on a shaft 112 rotatably journaled in one wall of the gear box 106 and in a support 114 inside the gear box.

A sprocket 116 is keyed to the shaft 112 for connection with a drive chain 118 passing around a sprocket 120 keyed to a shaft 122. Shaft 122 is operatively connected with a drive shaft 124 through the medium of a universal joint 126. Drive shaft 124 is driven by a suitable power take-off on the tractor (not shown). Thus rotation of the power shaft 124 will impart rotation to the shaft 82 which drives the chains 78 and 90 for operating the canvas 58 and the reel 24, respectively.

To one end of the shaft 112 I connect a crank 128 which is operatively connected with the right angular arm 130 of a rock shaft 132 through the medium of a link 134. Rock shaft 132 is supported in bearings 136 and 138 anchored to one of the end frame members 20. The forward end of the rock shaft 132 is provided with a right angular arm 140 pivotally connected at 142 with a pitman 144 connected with the sickle knife 16, as at 146. Thus the sickle knife 16 will be reciprocated through the medium of the rock shaft 132.

Grain cut by the sickle 16 falls upon the canvas 58 and is elevated and dropped onto canvases 148 and 150 spaced to provide an opening 152 into which the grain is delivered for forming the windrow. The forward margins of the canvases 148 and 150 extend underneath the canvas 58 so as to be in effective grain receiving relation with the elevating canvas. Canvas 148 operates upon rollers 154 and 156 rotating at right angles to the rollers 60 and 62. The forward end of the roller 154 is rotatably journaled in a post 158 riveted to a frame member 160 extending the full width of the frame 12 and riveted at its ends to the end frame members 20.

The rear end of the roller 154 is rotatably journaled in a bearing 162 anchored to the frame member 50. Roller 156 is rotatably journaled in the same manner as the roller 154, but includes a shaft extension 164 keyed to a gear 166 arranged in mesh with a gear 168 keyed to the shaft 122. Thus rotation of the shaft 122 will drive the canvas 148, which canvas travels with its upper face moving in the direction of the arrow 170 for moving the grain falling thereon into the opening 152.

Canvas 115 is mounted on rollers 172 and 174, which rollers are rotatably journaled in the same manner as the rollers 154 and 156. Roller 172 includes a shaft extension 176 provided with a sprocket 178 for connection with a chain 180 passing around a sprocket 182 keyed to the shaft 122. Canvas 150 travels with its upper run moving in the direction of the arrow 184 for moving cut grain falling thereon into the opening 152.

Figure 5 illustrates the windbreak, which comprises sections 186 and 188. Each section includes a wall 190 which may be attached to the end frame members 20 by riveting or welding and in the same manner to diagonal braces 192 attached to the vertical frames 22. Each section also includes a wall 194 which may be welded to the rear frame member 50 as well as to the bars 196 of the vertical frames 22. Sections 186 and 188 may be formed of suitable sheet metal, and are spaced as at 198.

In operation, the forward side of the frame 12 is tilted downwardly beyond the positions of Figures 2 and 3, which brings the rear frame member 50 to a position considerably above the stubble to accommodate the windrow. Since the space 152 is located midway between the ends of the sickle bar 14, the windrow will be located centrally of the swath cut by the harvester. Thus the frame or mount 38 may be located centrally of the tractor to which it is connected so that the windrow formed by the harvester will come between the wheels of the tractor.

In making the windbreak sectional so as to provide a space 198, I provide a window aligned with the space 152 which permits the operator of the tractor in the rear of the harvester to make observations, particularly a connection with the grain as it is being grouped in the windrow. Occasionally, large weeds might cause some blocking of the windrow formation. Thus the space 198 permits the operator to direct proper attention to windrow formation as well as lending access to the interior of the frame by merely stepping over the member 50.

In arranging the structure such that the windrow is formed intermediate the ends of the frame 12, I provide a construction which operates efficiently in a harvester designed to cut a wide swath. While the harvester may cut a wide swath, the canvases 148 and 150 are relatively short so that none of the canvases is burdened with a large accumulation of cut grain. Canvases 148 and 150 are loaded with grain cut by a portion only of the cutting reach of the sickle knife, and the grain cut by the knife in alignment with the opening 152 is dropped directly into that space.

To the frame 12 I connect shoes 200 which afford protection for the sickle bar 14 and the knife 18, in the event that unusual field irregularities should bring the cutting side of the frame too close to the soil, the shoes would hold the cutting knife out of the soil. Each shoe is provided with a shield 202. One side of the frame 12, i. e., the grain side, is provided with a dividing board 204 which deflects the cut grain at that end of the knife onto the canvas 58 so as to prevent its falling into the standing grain. One shield 202 affords protection for the pitman 144, while the other shield deflects the standing grain away from the vertical bar 30 at that end of the frame.

I claim:

A windrow harvester comprising a mount adapted for connection with a tractor located in the rear thereof, a frame pivotally mounted on said mount and having a grain cutting means, a reel mounted on said frame, an elevator mounted on said frame in cut grain receiving relation with respect to said grain cutting means and said reel, endless belt conveyors located partly underneath and in the rear of said elevator, a tractor driven shaft having a universal joint interposed therein, said endless belt conveyors being spaced to provide a windrow opening in the rear of said elevator intermediate its ends and said belt conveyors moving in opposite directions to carry cut grain to said windrow opening, each endless belt conveyor having a drive roller, a first sprocket keyed to one of said drive rollers, a second sprocket keyed to said tractor driven shaft, a drive chain connecting said first and second sprockets, the other of said drive rollers being provided with a first gear, a second gear keyed to said tractor driven shaft and meshing with said first gear to rotate the latter reversely of said first sprocket, a first rotative shaft element, a third sprocket keyed to said rotative shaft element, a fourth sprocket keyed to said tractor driven shaft, a chain connecting said third and fourth sprockets, said elevator having a drive roller, a first bevel gear keyed to said rotative shaft element, a second rotative shaft element having a second bevel gear keyed thereto and meshing with said first bevel gear, a fifth sprocket on said second rotative shaft element, a sixth sprocket mounted on said frame, a chain connecting said fifth and sixth sprockets, a pinion connected with said last-mentioned drive roller, a second pinion fixedly related to said sixth sprocket and meshing with said first-mentioned pinion, a crank member fixed to said first rotative shaft element, a crankshaft rotatably journaled on said frame and operatively connected with said grain cutting mechanism, a work arm operatively connecting said crank member and said crankshaft, said second rotative shaft element being provided with a seventh sprocket, an eighth sprocket connected with said reel, a chain operatively connecting said seventh and eighth sprockets, means for pivoting said frame, and a windbreak means extending along the sides and rear of said frame and open at the rear of said windrow opening.

JULIUS OMMODT.